United States Patent

[11] 3,617,440

[72] Inventor Greene W. Strother, Jr.
 Lake Jackson, Tex.
[21] Appl. No. 737,394
[22] Filed June 17, 1968
[45] Patented Nov. 2, 1971
[73] Assignee The Dow Chemical Company
 Midland, Mich.

[54] PROCESS FOR PROMOTING THE DRAINAGE FROM A WATER-PULP MEDIUM USING THE REACTION PRODUCT OF A POLYETHYLENIMINE HAVING A MOLECULAR WEIGHT OF AT LEAST 300 WITH A UREA
10 Claims, No Drawings

[52] U.S. Cl................................................ 162/168,
 260/2 EN
[51] Int. Cl..................................................... D21h 3/48
[50] Field of Search............................................. 162/166,
 167, 168, 169; 260/2 EN

[56] References Cited
UNITED STATES PATENTS
3,345,253 10/1967 Bestian et al. ................ 162/166
FOREIGN PATENTS
622,590 3/1963 Belgium ....................... 260/2 EN

*Primary Examiner*—S. Leon Bashore
*Assistant Examiner*—Frederick Frei
*Attorneys*—Griswold & Burdick and C. E. Rehberg

ABSTRACT: Accelerated drainage of the aqueous medium from pulp during paper manufacture is achieved by the addition of a small amount of the reaction product of polyethylenimine having a molecular weight of at least 300 and a urea. Addition of this product also imparts wet and dry strength to the paper.

PROCESS FOR PROMOTING THE DRAINAGE FROM A WATER-PULP MEDIUM USING THE REACTION PRODUCT OF A POLYETHYLENIMINE HAVING A MOLECULAR WEIGHT OF AT LEAST 300 WITH A UREA

BACKGROUND OF THE INVENTION

It is known that high molecular weight polyethylenimine is a useful drainage aid in paper manufacture. One great disadvantage of polyethylenimine, besides the high molecular weight necessary to obtain activity, is its tendency to yellow upon being dried in air.

It is also known that the reaction product of polyethylenimine and urea is useful for the mordanting of acid dyes in gelatin layers. See Van Hoof et al., U.S. Pat. No. 3,234,025.

It is further known that polyaminourelyene-epichlorohydrin reaction products impart wet strength to paper. See Earle, U.S. Pat. No. 3,204,664.

SUMMARY OF THE INVENTION

It has now been found that accelerated drainage of the aqueous medium from pulp during paper manufacture is achieved by the addition of a small amount of the reaction product of polyethylenimine and a urea. This product also imparts wet and dry strength to the paper. In addition, while polyethylenimine tends to yellow, the urea-modified polyethylenimine of the present invention greatly reduces color development upon being heat dried.

The polyethylenimine of the present invention is well known and is generally produced by the polymerization of ethylenimine in the presence of an acid catalyst. The molecular weight of the polyethylenimine used can vary widely, e.g. from 300 to 60,000 or higher. Preferably, the average molecular weight of the polyethylenimine used is between 600 and 60,00.

The ureas useful in this invention are those having the formula

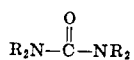

$$R_2N-\overset{O}{\underset{\|}{C}}-NR_2$$

where each R independently is H or alkyl having up to six carbon atoms (preferably alkyl having up to three carbon atoms). Thus, besides urea, the various alkyl-substituted ureas useful in this invention are the alkyl-substituted ureas such as methylurea, ethylurea and n-hexylurea; the dialkyl-substituted ureas such as N,N-dimethylurea, N,N'-diethylurea and N-methyl-N-ethylurea; the trialkyl-substituted ureas such as N,N,N'-trimethylurea, N,N-diethyl-N'-n-butylurea and N-methyl-N-ethyl-N'-propylurea; and the tetraalkyl-substituted ureas such as tetramethylurea, N,N-dimethyl-N,N'-diethylurea, and N,N,N'-trimethyl-N'-n-pentylurea.

In order to produce the polyethylenimine-urea reaction product, polyethylenimine and a urea are simply mixed and heated, in any convenient manner, until the product is formed. Generally, the reaction temperature is between 100° and 140° C. It is generally preferred to pass nitrogen through the reaction vessel during the reaction so as to facilitate the removal of the byproduct ammonia or amine. It is preferred to use a molar excess of amine groups in polyethylenimine to amide groups in the urea. Most preferably, the molar equivalent ratio of amine groups in polyethylenimine to amide groups in the urea is between 10 to 1 and 1 to 1.

According to the invention, the reaction product, as described above, is simply added, in any convenient manner, to the water-pulp medium so as to facilitate drainage of the aqueous medium from the pulp during paper manufacture. The methods and times of addition are well known to those skilled in the art. Generally, only a very small amount of the reaction product is needed to increase drainage. Typically, a concentration of the reaction product within the water-pulp medium between 0.01 and 1 percent, preferably between 0.0 and 0.5 percent, by weight based on dry pulp, will suffice.

The paper pulp can be any paper pulp commonly used the paper industry, e.g. bleached or unbleached soft woc such as southern or ponderosa pine. Of course, the aqueot medium and pulp can contain the usual additives such rosin, starch, pigments and the like. In general, it is preferre to conduct the drainage at a pH between 3.0 and 7.5, and mo preferred to drain at a pH on the acid side, e.g. between 4 an 6.

DESCRIPTION OF SPECIFIC EMBODIMENT

EXAMPLE 1

Into a 500-ml., three-neck flask equipped with a condense thermometer, stirrer and nitrogen purge, was placed 150 g. c polyethylenimine (having an average molecular weight c 1,800) and 42 g. of urea. This represents a molar ratio c amine groups in the polyethylenimine (PEI) to amide group in urea of 2.5 to 1. The temperature was raised to 130°–135 C. while nitrogen was passed through the flask to aid i: removal of the ammonia that was given off during the reac tion. The ammonia was titrated in a gas scrubber with HCl t determine the extent of the reaction. After 0.604 moles of am monia had been titrated, the temperature was reduced, 250 g of water was added, and the reaction was continued until total of 0.724 moles of ammonia had been titrated. Thi represents 51.7 percent of theoretical ammonia (based o 1.43 moles NH₃ possible from urea). The above experimen and others conducted in the same manner are reported ir table 1.

TABLE 1

| No. | PEI, g. | PEI, mol. wt. | Urea, g. | PEI/urea, eq. ratio | Temp. °C. | NH percen of theor |
|---|---|---|---|---|---|---|
| 1 | 150 | 1,800 | 42 | 2.5/1 | 130–135 | 51. |
| 2 | 150 | 1,800 | 21 | 5/1 | 130 | 79. |
| 3 | 150 | 1,800 | 21 | 5/1 | 135–140 | 80.( |
| 4 | 150 | 60,000 | 31 | 1.2/1 | 102 | (¹) |
| 5 | 150 | 60,000 | 20.6 | 1.8/1 | 102 | (¹) |

¹ Not calculated.

EXAMPLE 2

The products numbered 1, 2, 4 and 5 in table 1 above, were tested as drainage aids using the TAPPI Method T227. This method employs a container fitted with an orifice at the bottom and a means for measuring the overflow from the container. If the aqueous medium drains into the container faster than the orifice can allow it to escape, the container will overflow. The amount of overflow is a measure of the drainage rate.

In each experiment, the paper pulp was from a common batch, i.e. unbleached sulfite spruce and the temperature during testing was 20° C. The type of reaction product, amount of reaction product in 1 lb./ton based on the dry weight of the pulp, the pH and the amount of overflow is given for a series of experiments in table 2. "–" indicates the control.

TABLE 2

| Product No. from Table 1 | Amt. of product, lbs./ton | pH | Overflow, ml |
|---|---|---|---|
| – | – | – | 195 |
| 1 | 4 | 4.5 | 420 |
| 1 | 4 | 7.5 | 330 |
| 2 | 4 | 4.5 | 355 |
| 2 | 4 | 7.5 | 355 |
| 4 | 2 | 4.5 | 295 |

| | | | |
|---|---|---|---|
| 4 | 2 | 7.5 | 265 |
| 4 | 4 | 4.5 | 450 |
| 4 | 4 | 7.5 | 335 |
| 5 | 2 | 4.5 | 260 |
| 5 | 2 | 7.5 | 260 |
| 5 | 4 | 4.5 | 415 |
| 5 | 4 | 7.5 | 340 |

EXPERIMENT 3

Product number 3, as defined in table 1, was tested for both wet and dry strength on unbleached kraft that was beaten to 500 c.f.s. The polymer was added to the pulp prior to sheet formation, and the sheet was dried at 120° C. for 30 seconds prior to testing with a Mullins Burst Tester. The amount of polymer loading, based on tons of dry pulp and burst pressures are reported in table 3 below.

TABLE 3

| Loadings (No. ton) | Dry Strength | Wet Strength |
|---|---|---|
| 5 | 70.9 | 8.7 |
| 10 | 73.6 | 20.3 |
| 15 | 72.7 | 21.5 |
| 20 | 69.4 | 26.7 |
| 30 | 69.4 | 28.8 |
| control | 56.0 | 3.5 |

EXPERIMENT 4

To demonstrate the nonyellowing properties of the PEI-urea product, the following experiment was run according to TAPPI T425 m–48. Fiber glass cloth was dipped into a 1 percent aqueous solution of various products prepared according to the general method of example 1. The samples were then air dried and placed in a forced draft oven at 150° C. for 1 hour. The reduction of yellowing was measured as percent reflectance on a Photovalt Reflectance Meter Model 610 using a 610-w. search unit.

The molecular weight of PEI used, the molar ratio of amine groups in the PEI to amide groups in urea and the percent reflectance is reported in table 4 below.

TABLE 4

| PEI mol. wt. | Ratio amine/amide | Percent Reflectance |
|---|---|---|
| 60,000 | 1/1 | 67.9 |
| 60,000 | 1/0.45 | 53.5 |
| 60,000 | 1/0.6 | 56.0 |
| 1,800 | 1/0.1 | 50.7 |
| 1,800 | 1/0.4 | 55.8 |
| 60,000 alone | | 39.7 |
| 1,800 alone | | 43.1 |
| control | | 69.0 |

I claim:
1. In the process for draining the aqueous medium from a water-pulp medium during paper manufacture, the improvement which comprises adding to the water-pulp medium the reaction product of (a) a polyethylenimine having an average molecular weight of at least 300 and (b) a urea having the formula

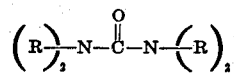

wherein each R independently is H or alkyl having up to six carbon atoms; said reaction product being added in a small but effective amount to promote drainage of the aqueous medium.

2. A process as defined in claim 1 wherein the polyethylenimine has an average molecular weight between 300 and 60,000.

3. A process as defined in claim 1 wherein each R is H.

4. A process as defined in claim 1 wherein a molar excess of amine groups in polyethylenimine to amide groups in the urea is used to form the reaction product.

5. A process as defined in claim 1 wherein a ratio of at least 1:1 of amine groups in polyethylenimine to amide groups in the urea is used to form the polyethylenimine and urea product.

6. A process as defined in claim 1 wherein the pH of said water-pulp medium is between 3.0 and 7.5.

7. A process as defined in claim 6 wherein the pH is between 4 and 6.

8. A process as defined in claim 1 wherein the concentration of reaction product within the water-pulp medium is between 0.01 and 1 percent, by weight, based on dry pulp.

9. The process as defined in claim 2 wherein the polyethylenimine has an average molecular weight between 600 and 60,000.

10. The process defined in claim 4 wherein the average molecular weight of said polyethylenimine is between 600 and 60,000 and the pH of said water-pulp medium is between 4 and 6.

* * * * *

PO-1050
(5/69)

UNITED STATES PATENT OFFICE
CERTIFICATE OF CORRECTION

Patent No. 3,617,440          Dated  2 November 1971

Inventor(s)   Greene W. Strother, Jr.

It is certified that error appears in the above-identified patent and that said Letters Patent are hereby corrected as shown below:

In column 1, line 19, change "3,204,664" to -- 3,240,664 --; in line 36 delete "60,00." and insert -- 60,000. --.

In column 2, line 61, delete "1 lb/ton" and insert -- lbs./ton --.

Signed and sealed this 9th day of May 1972.

(SEAL)
Attest:

EDWARD M. FLETCHER, JR.
Attesting Officer

ROBERT GOTTSCHALK
Commissioner of Patents